(12) United States Patent
Yi et al.

(10) Patent No.: US 9,947,254 B2
(45) Date of Patent: Apr. 17, 2018

(54) LIQUID CRYSTAL DISPLAY PANEL

(71) Applicant: Wuhan China Star Optoelectronics Technology Co., Ltd., Wuhan (CN)

(72) Inventors: Shijuan Yi, Wuhan (CN); Mang Zhao, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 15/238,709

(22) Filed: Aug. 16, 2016

(65) Prior Publication Data

US 2017/0337860 A1 Nov. 23, 2017

(30) Foreign Application Priority Data

May 19, 2016 (CN) .......................... 2016 1 0338143

(51) Int. Cl.
| | |
|---|---|
| *G01R 31/26* | (2014.01) |
| *G09G 3/00* | (2006.01) |
| *G02F 1/1345* | (2006.01) |
| *G09G 3/36* | (2006.01) |
| *G02F 1/1362* | (2006.01) |

(52) U.S. Cl.
CPC ......... *G09G 3/006* (2013.01); *G02F 1/13452* (2013.01); *G02F 1/13454* (2013.01); *G09G 3/3648* (2013.01); *G02F 2001/136254* (2013.01); *G09G 2300/0426* (2013.01); *G09G 2300/0819* (2013.01); *G09G 2310/0297* (2013.01); *G09G 2330/12* (2013.01)

(58) Field of Classification Search
CPC ........ G01R 21/133; G01R 27/14; G06F 13/20
USPC ............. 324/76.11, 76.61, 76.69, 76.74, 103
See application file for complete search history.

(56) References Cited

U.S. PATENT DOCUMENTS

| | | | | |
|---|---|---|---|---|
| 6,617,972 B2* | 9/2003 | Takarada | ........... | G08B 21/0484 324/538 |
| 8,779,729 B2* | 7/2014 | Shiraishi | ............ | G01R 31/3606 320/134 |
| 2007/0170948 A1* | 7/2007 | Chang | ................ | G02F 1/136204 324/760.02 |
| 2009/0213288 A1* | 8/2009 | Chen | ..................... | G02F 1/1303 349/43 |
| 2011/0102694 A1* | 5/2011 | Cho | ....................... | H01L 27/124 349/39 |
| 2012/0098518 A1* | 4/2012 | Unagami | ............. | G01R 22/066 324/74 |

* cited by examiner

*Primary Examiner* — Giovanni Astacio-Oquendo
(74) *Attorney, Agent, or Firm* — Leong C. Lei

(57) ABSTRACT

The present invention provides a liquid crystal display panel. The array test circuit (200) comprises a test control unit including a N type thin film transistor and a P type thin film transistor, wherein one thin film transistor is employed to be the output thin film transistor, and the other thin film transistor is employed to be the voltage stabilization thin film transistor. When the liquid crystal display panel is in the normal display state, the test control signal (ATEN) controls the output thin film transistor to be deactivated and controls the voltage stabilization thin film transistor to be activated so that the voltage difference of the gate and the source of the output thin film transistor is zero. Thus, the leakages on the data lines in the active display area (100) are consistent.

10 Claims, 6 Drawing Sheets

LIQUID CRYSTAL DISPLAY PANEL

FIELD OF THE INVENTION

The present invention relates to a display technology field, and more particularly to a liquid crystal display panel.

BACKGROUND OF THE INVENTION

The Liquid Crystal Display (LCD) possesses advantages of thin body, power saving and no radiation to be widely used in many application scope, such as LCD TV, mobile phone, personal digital assistant (PDA), digital camera, notebook, laptop, and dominates the flat panel display field.

Most of the liquid crystal displays on the present market are backlight type liquid crystal displays, which comprise a liquid crystal display panel and a backlight module. The working principle of the liquid crystal display panel is that the Liquid Crystal is injected between the Thin Film Transistor Array Substrate (TFT array substrate) and the Color Filter (CF). The light of backlight module is refracted to generate images by applying driving voltages to the two substrates for controlling the rotations of the liquid crystal molecules.

With the development of Low Temperature Poly-Silicon (LTPS) semiconductor thin film transistor, and because the LTPS semiconductor itself has the property of ultra-high carrier mobility, and thus the peripheral circuit around the panel also became the focus that the industry pays lots of attentions.

Please refer to FIG. 1 which is a structure diagram of a liquid crystal display panel according to prior art, comprising an Active Area (AA) 100', a GOA (Gate Driver on Array) circuit 200', a Fanout wiring 300', a demultiplexer (Demux) 400', a Wire On Array (WOA) 500', an Integrated Circuit (IC) 600', a Flexible Printed Circuit (FPC) 700' and an Array Test circuit 800'. The active area 100' is employed for the display of pixels, and N is set to be a positive integer. The active area 100' comprises 4N data lines which are mutually parallel, sequentially aligned and employed to charge the pixels. The arbitrary 4 adjacent data lines in the 4N data lines are one unit to be tested. The four data lines of each unit to be tested are respectively defined to be the first, the second, the third and the fourth data lines D1', D2', D3', D4'. The data lines in the array test circuit 800' and the active area 100' are electrically coupled, and employed to perform test to the electrical properties of the array substrate after the manufacture of the array substrate is completed.

Please refer to FIG. 2, which is a circuit diagram of an array test circuit of the liquid crystal display panel shown in FIG. 1, and the array test circuit 800' comprises N array test circuit units which are paratactic, and each array test circuit unit corresponds to the units to be tested in one active area 100'; each array test circuit comprises, a first thin film transistor T1', a second thin film transistor T2', a third thin film transistor T3', a fourth thin film transistor T4', a fifth thin film transistor T5', a sixth thin film transistor T6', a seventh thin film transistor T7' and an eighth thin film transistor T8'; gates of the first, the second, the third and the fourth thin film transistors T1', T2', T3', T4' respectively receive the first, the second, the third and the fourth test clock signals ACK1', ACK2', ACK3', ACK4', and all sources receive the test data signals Data', and drains are electrically coupled to the first, the second the third and the fourth nodes A', B', C', D', respectively; all gates of the fifth, the sixth, the seventh and the eighth thin film transistors T5', T6', T7', T8' receive the test control signal ATEN', and sources are electrically coupled to the first, the second the third and the fourth nodes A', B', C', D', respectively, and drains are electrically coupled to the first, the second the third and the fourth data lines D1', D2', D3', D4' in the corresponding unit to be tested, respectively.

Please refer to FIG. 3, which is a sequence diagram of the array test circuit of the liquid crystal display panel shown in FIG. 2. As performing the array test, the test control signal ATEN' is high voltage level to activate the fifth, the sixth, the seventh and the eighth thin film transistors T5', T6', T7', T8', and the first, the second, the third and the fourth test clock signals ACK1', ACK2', ACK3', ACK4' sequentially provide high voltage level to sequentially activate the first, the second, the third and the fourth thin film transistors T1', T2', T3', T4', and the changed data signals Data are respectively inputted to the first, the second, the third and the fourth data lines D1', D2', D3', D4', and after the corresponding test clock signals ACK1', ACK2', ACK3', ACK4' are converted to be low voltage levels and keep stable, and then until the next time that the corresponding test clock signal provides high voltage level, the test data signal Data' is written to the corresponding data line, again. As the array test is accomplished and the liquid crystal display performs the normal display, the test control signal ATEN' is low voltage level, and the data lines D1', D2', D3', D4' are provided with data signals by the control IC 600'. Then, the voltage levels of the first, the second, the third and the fourth nodes A', D', C', D' are in the unknown state to make the voltage differences Vgs of the gates and the sources of the fifth, the sixth, the seventh and the eighth thin film transistors T5', T6', T7', T8' generate floating to lead to the nonuniform leakages on the different data lines. Thus, the image display in the active area 100' is nonuniform and the product quality descends.

SUMMARY OF THE INVENTION

An objective of the present invention is to provide a liquid crystal display panel, in which the node voltage level in the array test circuit is stable as normally displaying, and the leakages of the respective data lines are consistent so that the image display in the active display area is uniform and the product quality is high.

For realizing the aforesaid objective, the present invention provides a liquid crystal display panel, comprising: an active display area and an array test circuit electrically coupled to the active display area; wherein the active display area comprises a plurality of units to be tested, and each unit to be tested comprises at least two data lines;

the array test circuit comprises a plurality of array test circuit unit corresponding to the plurality of units to be tested, and each array test circuit unit comprises at least two array test branches;

an amount of the array test branches in each array test circuit unit is the same as an amount of the data lines in each unit to be tested;

each array test branch comprises a branch control unit and a test control unit;

the branch control unit comprises an input end, an output end and a control end, and the input end of the branch control unit receives a data signal, and the control end receives a test clock signal corresponding to the branch control unit, and the output end is electrically coupled to the test control unit;

the test control unit comprises: an output thin film transistor and a voltage stabilization thin film transistor;

a gate of the output thin film transistor is electrically coupled to a test control signal, and a source is electrically coupled to the output end of the branch control unit, and a drain is electrically coupled to the data line corresponding to the array test branch, and both a gate and a source of the voltage stabilization thin film transistor receives the test control signal, and a drain is electrically coupled to the output end of the branch control unit;

the output thin film transistor is one of a N type thin film transistor and a P type thin film transistor, and the voltage stabilization thin film transistor is the other one of the N type thin film transistor and the P type thin film transistor, which is different from the output thin film transistor.

The branch control unit comprises a branch control thin film transistor, and a gate of the branch control thin film transistor is the control end of the branch control unit, and a source is the input end of the branch control unit, and a drain is the output end of the branch control unit.

The each unit to be tested comprises four data lines, and each array test circuit unit comprises four array test branches.

The liquid crystal display panel further comprises: a multiplexer electrically coupled to the active display area, a fanout wire electrically coupled to the multiplexer, a control IC electrically coupled to the fanout wire, a peripheral wire electrically coupled to the control IC, a GOA circuit electrically coupled to the peripheral wire and the active display area and a flexible circuit board electrically coupled to the control IC.

The test data signal, the test control signal and the test clock signal are provided by an external sequence controller.

The voltage stabilization thin film transistor is the P type thin film transistor; the output thin film transistor is the N type thin film transistor.

The test control signal provides high voltage level as the array test circuit is working, and as the array test is accomplished, the test control signal provides low voltage level.

A voltage value of the low voltage level provided by the test control signal is −7V.

The voltage stabilization thin film transistor is the N type thin film transistor; the output thin film transistor is the P type thin film transistor.

The test control signal provides low voltage level as the array test circuit is working, and as the array test is accomplished, the test control signal provides high voltage level.

The benefits of the present invention are: the present invention provides a liquid crystal display panel. The array test circuit comprises a test control unit including a N type thin film transistor and a P type thin film transistor, wherein one thin film transistor is employed to be the output thin film transistor, in which a gate receives the test control signal, a source and a source of the other thin film transistor are electrically coupled to one node, and a drain is electrically coupled to the corresponding data line in the active display area, and the other thin film transistor is employed to be the voltage stabilization thin film transistor, in which both a gate and a source receive the test control signal. When the liquid crystal display panel is in the normal display state, the test control signal controls the output thin film transistor to be deactivated and controls the voltage stabilization thin film transistor to be activated to make the voltage of the node and the voltage provided by the test control signal be consistent so that the voltage difference of the gate and the source of the output thin film transistor is zero. Thus, the leakages on the data lines in the active display area are consistent, and the image display of the liquid crystal display panel is uniform and the product quality is high.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
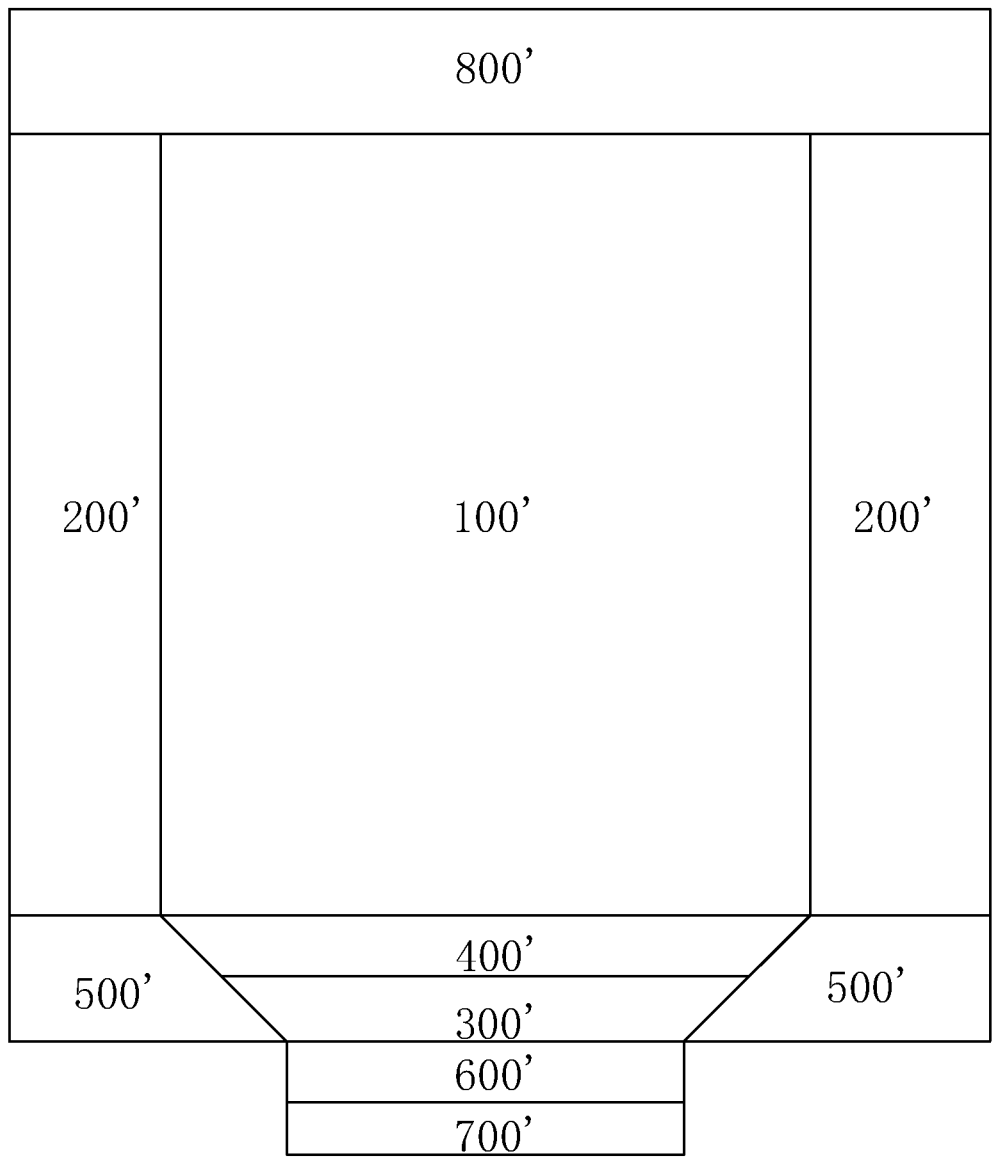
FIG. 1 is a structure diagram of a liquid crystal display panel according to prior art.
Figure 2:
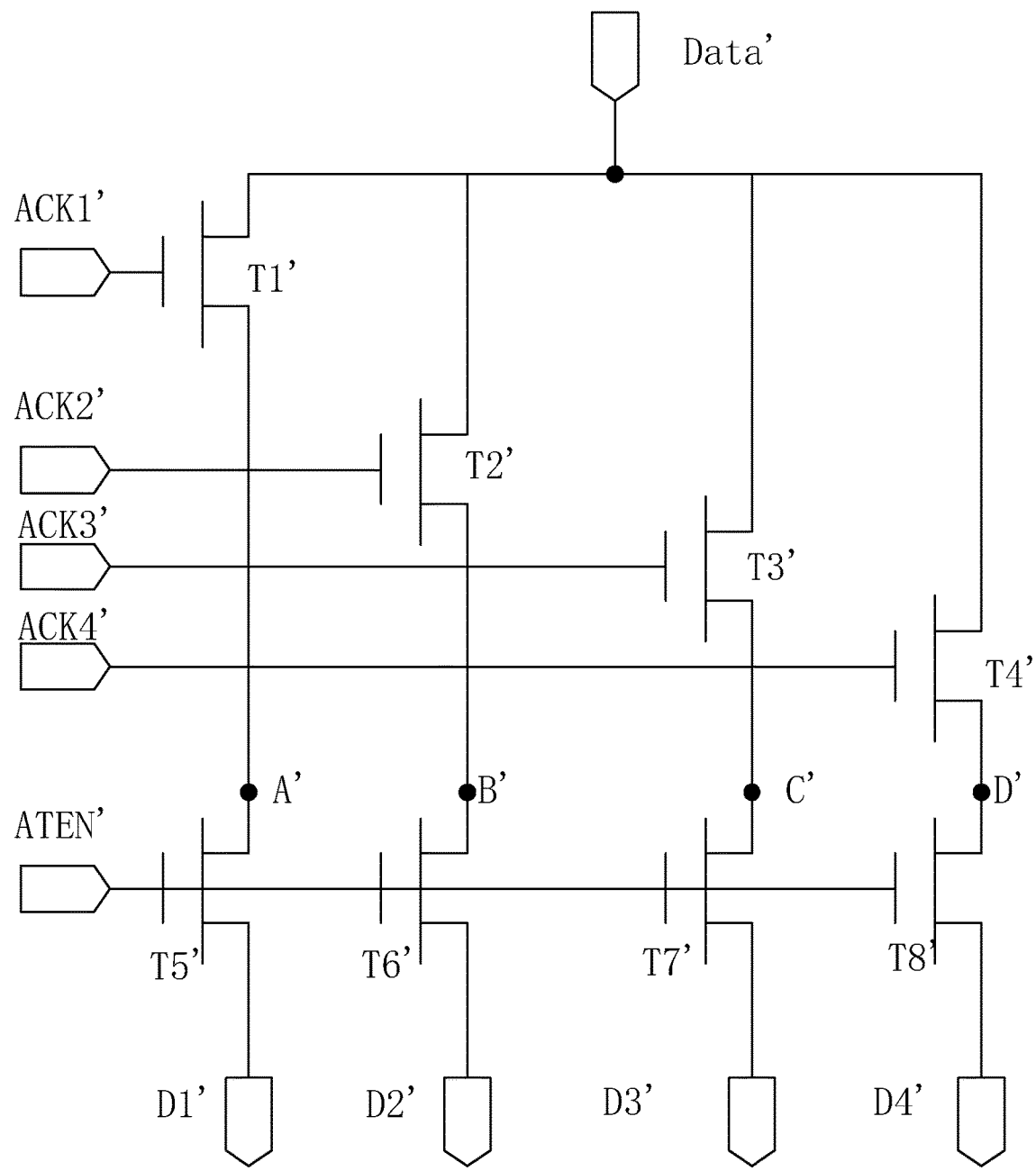
FIG. 2 is a circuit diagram of an array test circuit of the liquid crystal display panel shown in FIG. 1.
Figure 3:
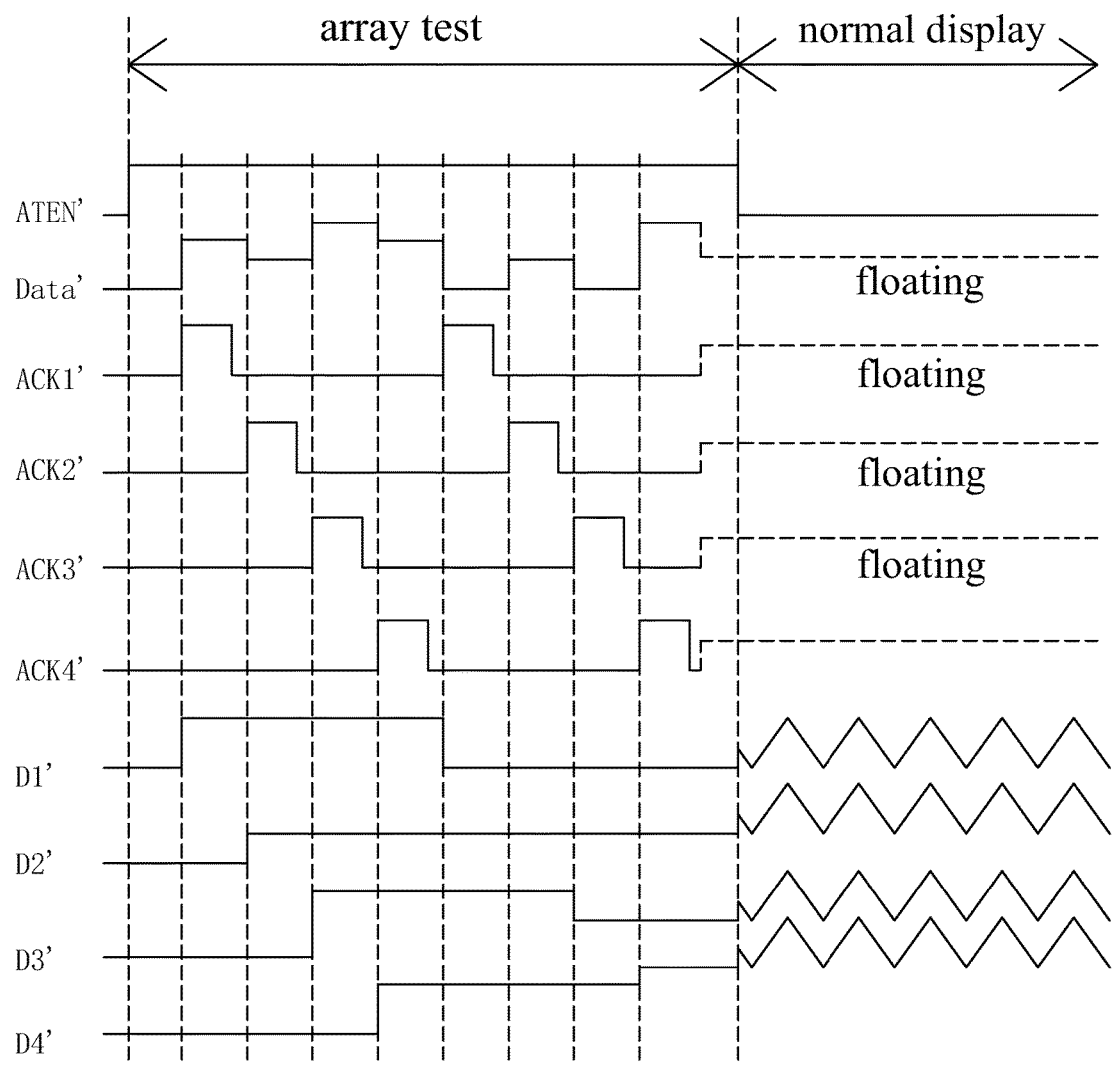
FIG. 3 is a sequence diagram of the array test circuit of the liquid crystal display panel shown in FIG. 2.
Figure 4:
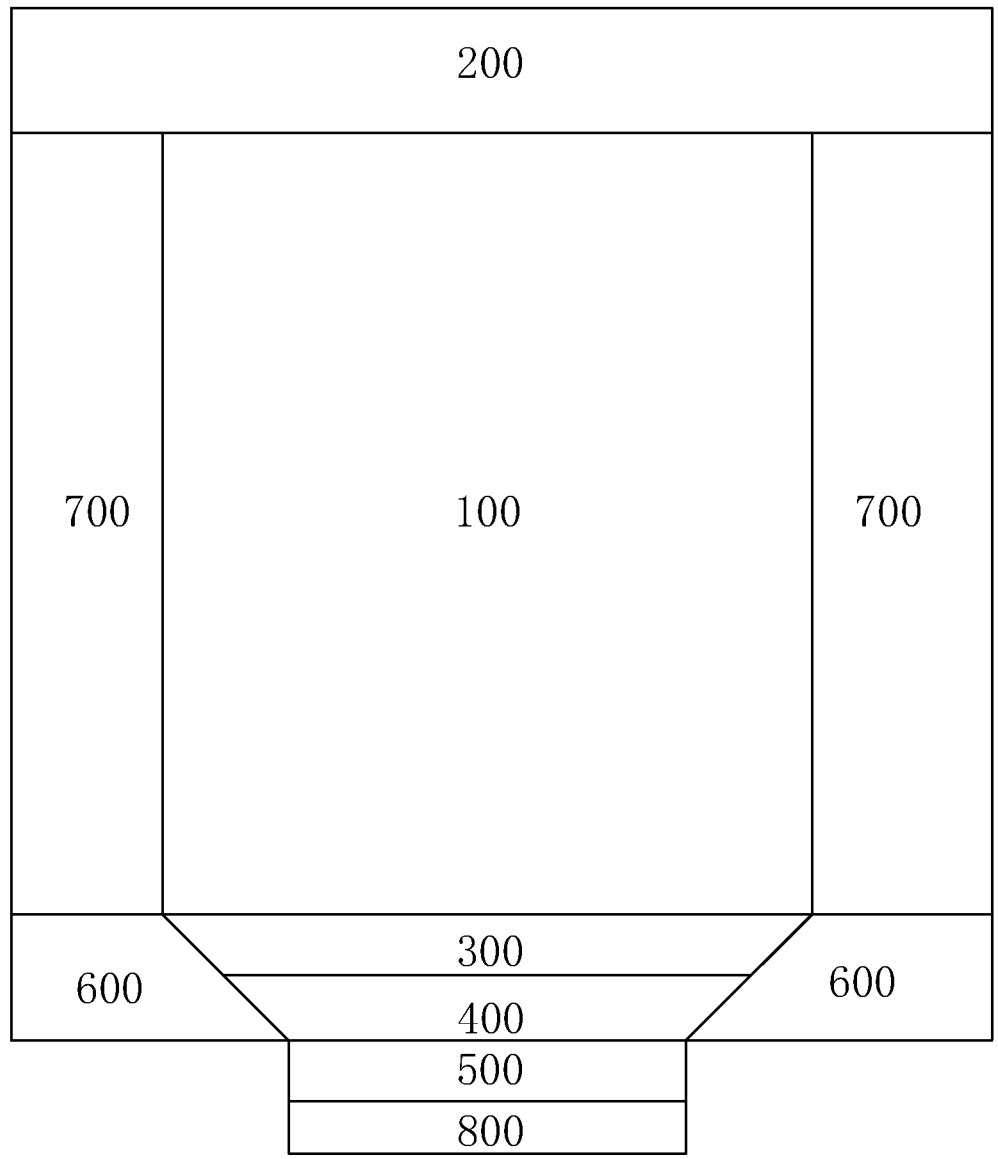
FIG. 4 is a structure diagram of a liquid crystal panel according to the present invention.

Please refer to FIG. 4. The present invention provides a liquid crystal display panel, comprising: an active display area 100 and an array test circuit 200 electrically coupled to the active display area 100.

Specifically, the liquid crystal display panel further comprises: a multiplexer 300 electrically coupled to the active display area 100, a fanout wire 400 electrically coupled to the multiplexer 300, a control IC 500 electrically coupled to the fanout wire 400, a peripheral wire 600 electrically coupled to the control IC 500, a GOA circuit 700 electrically coupled to the peripheral wire 600 and the active display area 100 and a flexible circuit board 800 electrically coupled to the control IC 500. The multiplexer 300, the fanout wire 400, the control IC 500, the peripheral wire 600 and the flexible circuit board 800 are all located at the lower side of the active display area 100. The amount of the GOA circuit 700 is two, which are respectively located at the left, right two sides of the active display area 100. The array test circuit 200 is located at the upper side of the active display area.

Furthermore, the active display area 100 is employed for the image display of the liquid crystal display panel; the array test circuit 200 is employed to implement array test to the array substrate after the manufacture of the array substrate is accomplished; the control IC 500 is employed to send the drive signal to drive the liquid crystal display panel for display; the fanout wire 400 is in charge of connecting the wiring between the control IC 500 and the multiplexer 300; the multiplexer 300 is employed to split the data signal provided by the control IC 500 into a plurality of data signals; the peripheral wire 600 is in charge of transmitting the scan drive signal provided by the control IC 500 to the GOA circuit 700; the GOA circuit 700 is employed to drive the thin film transistors inside the liquid crystal display panel to work for making the liquid crystal display to work; the flexible circuit board 800 is employed to connect the mainboard of the liquid crystal display device.

Figure 5:
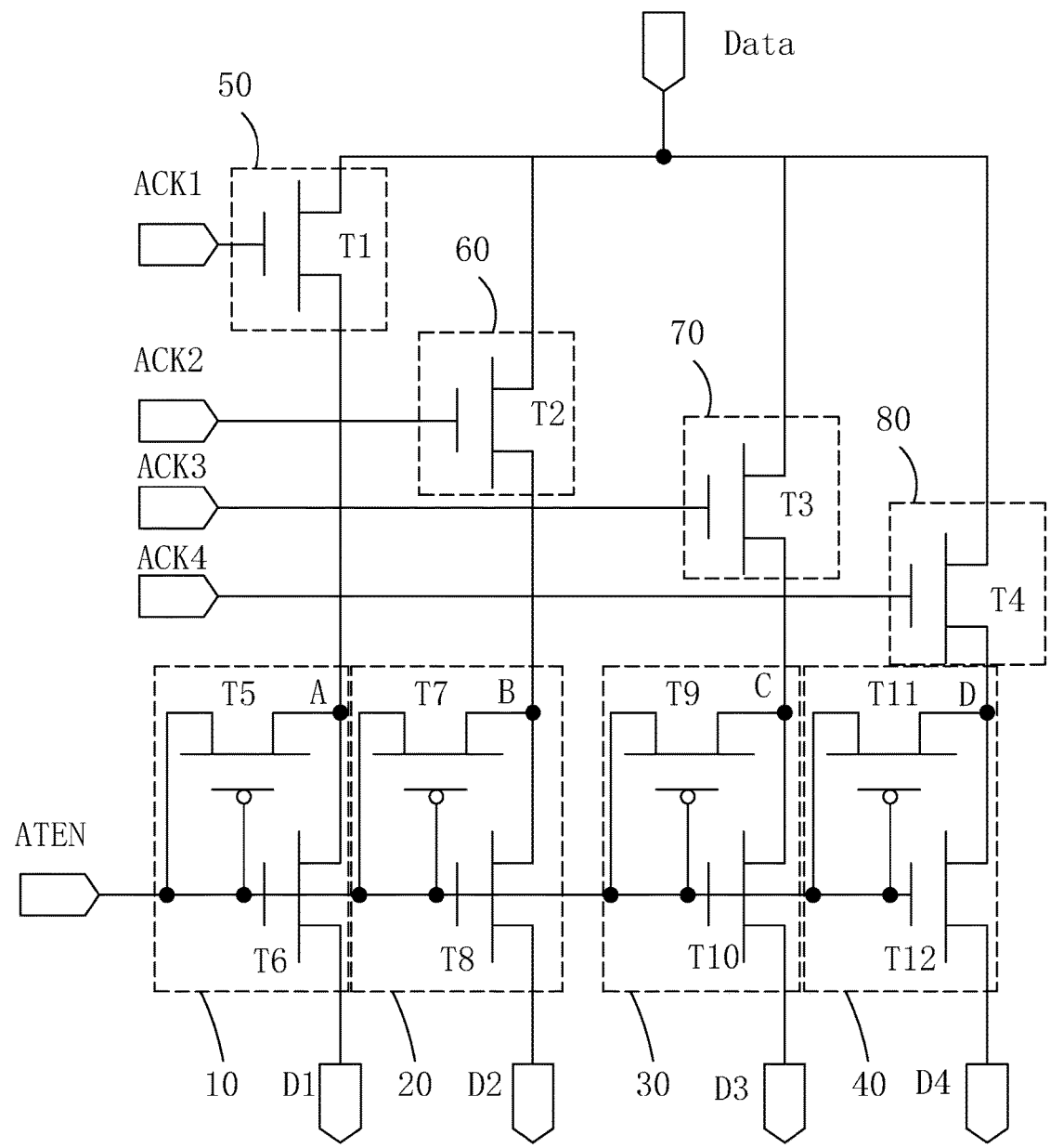
FIG. 5 is a circuit diagram of the array test circuit of the first embodiment according to the liquid crystal display panel of the present invention.
Figure 6:
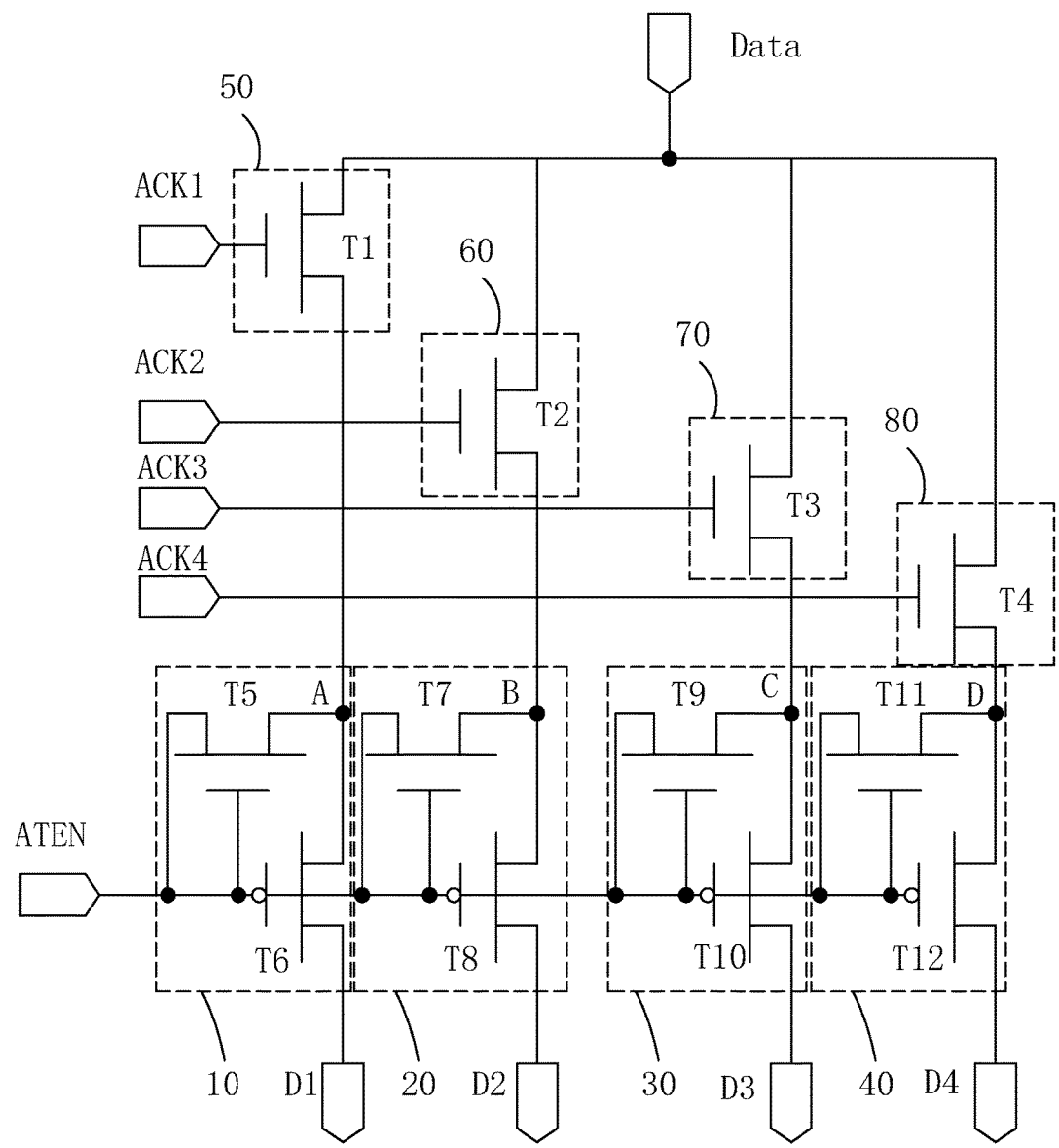
FIG. 6 is a circuit diagram of the array test circuit of the second embodiment according to the liquid crystal display panel of the present invention.

Specifically, the active display area 100 comprises a plurality of units to be tested, and each unit to be tested comprises at least two data lines;

the array test circuit 200 comprises a plurality of array test circuit unit corresponding to the plurality of units to be tested, and each array test circuit unit comprises at least two array test branches;

an amount of the array test branches in each array test circuit unit is the same as an amount of the data lines in each unit to be tested;

each array test branch comprises a branch control unit and a test control unit;

the branch control unit comprises an input end, an output end and a control end, and the input end of the branch control unit receives a data signal Data, and the control end receives a test clock signal corresponding to the branch control unit, and the output end is electrically coupled to the test control unit of the array test branch where the branch control unit is;

the test control unit comprises: an output thin film transistor and a voltage stabilization thin film transistor;

a gate of the output thin film transistor is electrically coupled to a test control signal ATEN, and a source is electrically coupled to the output end of the branch control unit, and a drain is electrically coupled to the data line corresponding to the array test branch, and both a gate and a source of the voltage stabilization thin film transistor receives the test control signal ATEN, and a drain is electrically coupled to the output end of the branch control unit;

the output thin film transistor is one of a N type thin film transistor and a P type thin film transistor, and the voltage stabilization thin film transistor is the other one of the N type thin film transistor and the P type thin film transistor, which is different from the output thin film transistor.

the amount included in each unit to be tested and the amount of the array test branches included in the array test circuit unit can be determined according to the requirement. As shown in FIG. 5 and FIG. 6, in the first and the second embodiments of the present invention, each unit to be tested comprises four data lines, and each array test circuit unit comprises four array test branches.

As shown in FIG. 5 and FIG. 6, the four data lines of each unit to be tested respectively are the first, the second, the third and the fourth data lines D1, D2, D3, D4. In the normal display stage, the data lines receive the display data signals transmitted by the control IC 500; in the array test stage, the data lines receive the test data signals Data transmitted by the array test circuit.

Specifically, referring to FIG. 5, each array test circuit comprises: a first test control unit 10, a second test control unit 20, a third test control unit 30, a fourth test control unit 40, a first branch control unit 50, a second branch control unit 60, a third branch control unit 70 and a fourth branch control unit 80;

The first branch control unit 50 comprises: a first thin film transistor T1, and a gate of the first thin film transistor T1 receives a first test clock signal ACK1, and a source receives a test data signal Data, and a drain is electrically coupled to a first node A; the second branch control unit 60 comprises: a second thin film transistor T2, and a gate of the second thin film transistor T2 receives a second test clock signal ACK2, and a source receives a test data signal Data, and a drain is electrically coupled to a second node B; the third branch control unit 70 comprises: a third thin film transistor T3, and a gate of the third thin film transistor T3 receives a third test clock signal ACK3, and a source receives a test data signal Data, and a drain is electrically coupled to a third node C;

the fourth branch control unit 80 comprises: a fourth thin film transistor T4, and a gate of the fourth thin film transistor T4 receives a fourth test clock signal ACK4, and a source receives a test data signal Data, and a drain is electrically coupled to a fourth node D; the first test control unit 10 comprises: a fifth thin film transistor T5 and a sixth thin film transistor T6; both a gate and a source of the fifth thin film transistor T5 receives a test control signal ATEN, and a drain is electrically coupled to the first node A; a gate of the sixth thin film transistor T6 receives the test control signal ATEN, and a source is electrically coupled to the first node A, and a drain is electrically coupled to the first data line D1 in the corresponding unit to be tested; the second test control unit 20 comprises: a seventh thin film transistor T7 and an eighth thin film transistor T8; both a gate and a source of the seventh thin film transistor T7 receives a test control signal ATEN, and a drain is electrically coupled to the second node B; a gate of the eighth thin film transistor T8 receives the test control signal ATEN, and a source is electrically coupled to the second node B, and a drain is electrically coupled to the second data line D2 in the corresponding unit to be tested; the third test control unit 30 comprises: a ninth thin film transistor T9 and a tenth thin film transistor T10; both a gate and a source of the ninth thin film transistor T9 receives a test control signal ATEN, and a drain is electrically coupled to the third node C; a gate of the tenth thin film transistor T10 receives the test control signal ATEN, and a source is electrically coupled to the third node C, and a drain is electrically coupled to the third data line D3 in the corresponding unit to be tested; the fourth test control unit 40 comprises: an eleventh thin film transistor T11 and a twelfth thin film transistor T12; both a gate and a source of the eleventh thin film transistor T11 receives a test control signal ATEN, and a drain is electrically coupled to the fourth node D; a gate of the twelfth thin film transistor T12 receives the test control signal ATEN, and a source is electrically coupled to the fourth node D, and a drain is electrically coupled to the fourth data line D4 in the corresponding unit to be tested.

Specifically, the fifth, the seventh, the ninth and the eleventh thin film transistors T5, T7, T9, T11 are all one of a N type thin film transistor and a P type thin film transistor, and the sixth, the eighth, the tenth and the twelfth thin film transistors T6, T8, T10, T12 are all the other one of the N type thin film transistor and the P type thin film transistor, which is different from the fifth, the seventh, the ninth and the eleventh thin film transistors T5, T7, T9, T11. the fifth thin film transistor T5, the seventh thin film transistor T7, the ninth thin film transistor T9 and the eleventh thin film transistor T11 are voltage stabilization thin film transistors, and are employed to respectively control the voltage of the first node A, the second node B, the third node C and the fourth node D to be stable in the non array test stage; the sixth thin film transistor T6, the eighth thin film transistor T8, the tenth thin film transistor T10 and the twelfth thin film transistor T12 are output thin film transistors, and are employed to input the test data signals Data to the data lines D1, D2, D3, D4 in the unit to be tested in the array test stage.

Specifically, the test data signal Data, the test control signal ATEN and the first test clock signal ACK1, the second test clock signal ACK2, the third test clock signal ACK3 and the fourth test clock signal ACK4 are provided by an external sequence controller.

Specifically, as referring to FIG. 5, in the first embodiment of the present invention, the fifth thin film transistor T5, the seventh thin film transistor T7, the ninth thin film transistor T9 and the eleventh thin film transistor T11 are P type thin film transistors; the sixth thin film transistor T6, the eighth thin film transistor T8, the tenth thin film transistor T10 and the twelfth thin film transistor T12 are N type thin film transistors.

Specifically, as performing the array test, the test control signal ATEN is high voltage level to activate the sixth thin film transistor T6, the eighth thin film transistor T8, the tenth thin film transistor T10 and the twelfth thin film transistor T12 and to deactivate the fifth thin film transistor T5, the seventh thin film transistor T7, the ninth thin film transistor T9 and the eleventh thin film transistor T11, and the first, the second, the third and the fourth test clock signals ACK1, ACK2, ACK3, ACK4 sequentially provide high voltage level to sequentially activate the first, the second, the third and the fourth thin film transistors T1, T2, T3, T4, and the changed test data signals Data are respectively inputted to the first, the second, the third and the fourth data lines D1, D2, D3, D4, and after the corresponding test clock signals ACK1, ACK2, ACK3, ACK4 are converted to be low voltage levels and keep stable, and then until the next time that the corresponding test clock signal provides high voltage level, the test data signal Data is written to the corresponding data line, again.

Specifically, as the array test is finished, the test control signal ATEN is low voltage level. Preferably, a voltage value of the low voltage level provided by the test control signal ATEN is -7V. Then, the sixth thin film transistor T6, the eighth thin film transistor T8, the tenth thin film transistor T10 and the twelfth thin film transistor T12 are deactivated, and the first, the second, the third and the fourth data lines D1, D2, D3, D4 in the active display area 100 are provided with display data signals by the control IC 500, and meanwhile, the fifth thin film transistor T5, the seventh thin film transistor T7, the ninth thin film transistor T9 and the eleventh thin film transistor T11 are activated, and the first node A, the second node B, the third node C and the fourth node D are pulled down to low voltage level, which is provided by the control signal ATEN and keep stable, and the voltage value is -7V, which make the voltage differences of the gates and the sources of the sixth thin film transistor T6, the eighth thin film transistor T8, the tenth thin film transistor T10 and the twelfth thin film transistor T12 be zero and keep stable, and then the leakages of the first, the second, the third and the fourth data lines D1, D2, D3, D4 are consistent, and thus to make the image display in the active display area 100 uniform to promote the quality of the liquid crystal display panel.

Please refer to FIG. 6, which is a circuit diagram of the array test circuit of the second embodiment according to the liquid crystal display panel of the present invention. The difference of the second embodiment from the first embodiment in the present invention is that the fifth thin film transistor T5, the seventh thin film transistor T7, the ninth thin film transistor T9 and the eleventh thin film transistor T11 are N type thin film transistors; the sixth thin film transistor T6, the eighth thin film transistor T8, the tenth thin film transistor T10 and the twelfth thin film transistor T12 are P type thin film transistors. Correspondingly, as the array test circuit is working, the test control signal ATEN provides low voltage level to activate the sixth thin film transistor T6, the eighth thin film transistor T8, the tenth thin film transistor T10 and the twelfth thin film transistor T12 and to deactivate the fifth thin film transistor T5, the seventh thin film transistor T7, the ninth thin film transistor T9 and the eleventh thin film transistor T11, and the changed test data signals Data are respectively inputted to the first, the second, the third and the fourth data lines D1, D2, D3, D4; as the array test is finished, the test control signal ATEN provides high voltage level to deactivate the sixth thin film transistor T6, the eighth thin film transistor T8, the tenth thin film transistor T10 and the twelfth thin film transistor T12 and to activate the fifth thin film transistor T5, the seventh thin film transistor T7, the ninth thin film transistor T9 and the eleventh thin film transistor T11, and the first node A, the second node B, the third node C and the fourth node D are raised up to high voltage level provided by the control signal ATEN and keep stable. The reset is the same as the first embodiment, and the repeated description is omitted here.

In conclusion, the present invention provides a liquid crystal display panel. The array test circuit comprises a test control unit including a N type thin film transistor and a P type thin film transistor, wherein one thin film transistor is employed to be the output thin film transistor, in which a gate receives the test control signal, a source and a source of the other thin film transistor are electrically coupled to one node, and a drain is electrically coupled to the corresponding data line in the active display area, and the other thin film transistor is employed to be the voltage stabilization thin film transistor, in which both a gate and a source receive the test control signal. When the liquid crystal display panel is in the normal display state, the test control signal controls the output thin film transistor to be deactivated and controls the voltage stabilization thin film transistor to be activated to make the voltage of the node and the voltage provided by the test control signal be consistent so that the voltage difference of the gate and the source of the output thin film transistor is zero. Thus, the leakages on the data lines in the active display area are consistent, and the image display of the liquid crystal display panel is uniform and the product quality is high.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display panel, comprising: an active display area (100) and an array test circuit (200) electrically coupled to the active display area (100); wherein
   the active display area (100) comprises a plurality of units to be tested, and each unit to be tested comprises at least two data lines;
   the array test circuit (200) comprises a plurality of array test circuit unit corresponding to the plurality of units to be tested, and each array test circuit unit comprises at least two array test branches;
   an amount of the array test branches in each array test circuit unit is the same as an amount of the data lines in each unit to be tested;
   each array test branch comprises a branch control unit and a test control unit;
   the branch control unit comprises an input end, an output end and a control end, and the input end of the branch control unit receives a data signal (Data), and the control end receives a test clock signal corresponding to the branch control unit, and the output end is electrically coupled to the test control unit;
   the test control unit comprises: an output thin film transistor and a voltage stabilization thin film transistor; a gate of the output thin film transistor is electrically coupled to a test control signal (ATEN), and a source of the output thin film transistor is electrically coupled to the output end of the branch control unit, and a drain of the output thin film transistor is electrically coupled to the data line corresponding to the array test branch, and both a gate of the voltage stabilization thin film transistor and a source of the voltage stabilization thin film transistor receives the test control signal (ATEN), and a drain of the voltage stabilization thin film transistor is electrically coupled to the output end of the branch control unit;

the output thin film transistor is one of a N type thin film transistor and a P type thin film transistor, and the voltage stabilization thin film transistor is the other one of the N type thin film transistor and the P type thin film transistor, which is different from the output thin film transistor.

2. The liquid crystal display panel according to claim 1, wherein the branch control unit comprises a branch control thin film transistor, and a gate of the branch control thin film transistor is the control end of the branch control unit, and a source is the input end of the branch control unit, and a drain is the output end of the branch control unit.

3. The liquid crystal display panel according to claim 1, wherein the each unit to be tested comprises four data lines, and each array test circuit unit comprises four array test branches.

4. The liquid crystal display panel according to claim 1, wherein the liquid crystal display panel further comprises: a multiplexer (300) electrically coupled to the active display area (100), a fanout wire (400) electrically coupled to the multiplexer (300), a control IC (500) electrically coupled to the fanout wire (400), a peripheral wire (600) electrically coupled to the control IC (500), a GOA circuit (700) electrically coupled to the peripheral wire (600) and the active display area (100) and a flexible circuit board (800) electrically coupled to the control IC (500).

5. The liquid crystal display panel according to claim 1, wherein the test data signal, the test control signal and the test clock signal are provided by an external sequence controller.

6. The liquid crystal display panel according to claim 1, wherein the voltage stabilization thin film transistor is the P type thin film transistor; the output thin film transistor is the N type thin film transistor.

7. The liquid crystal display panel according to claim 4, wherein the test control signal (ATEN) provides high voltage level as the array test circuit (200) is working, and as the array test is accomplished, the test control signal (ATEN) provides low voltage level.

8. The liquid crystal display panel according to claim 5, wherein a voltage value of the low voltage level provided by the test control signal is −7V.

9. The liquid crystal display panel according to claim 1, wherein the voltage stabilization thin film transistor is the N type thin film transistor; the output thin film transistor is the P type thin film transistor.

10. The liquid crystal display panel according to claim 7, wherein the test control signal (ATEN) provides low voltage level as the array test circuit (200) is working, and as the array test is accomplished, the test control signal (ATEN) provides high voltage level.

* * * * *